United States Patent
Gomyo et al.

(10) Patent No.: US 6,967,421 B2
(45) Date of Patent: Nov. 22, 2005

(54) CORE FOR MOTOR, MOTOR FURNISHED TO THE CORE AND METHOD FOR MANUFACTURING THE MOTOR

(75) Inventors: Masato Gomyo, Nagano (JP); Noboru Ashibe, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 96 days.

(21) Appl. No.: 10/423,836

(22) Filed: Apr. 25, 2003

(65) Prior Publication Data

US 2004/0000830 A1 Jan. 1, 2004

(30) Foreign Application Priority Data

Apr. 30, 2002 (JP) .............................. 2002-129224

(51) Int. Cl.$^7$ ........................... H03K 3/52; H02K 3/18; H02K 15/05; H02K 15/095
(52) U.S. Cl. ....................... 310/180; 310/71; 310/179; 310/216
(58) Field of Search ................................ 310/179, 180, 310/71, 208, 214, 216; 29/605, 596; 242/232, 242/233

(56) References Cited

U.S. PATENT DOCUMENTS

| | | | |
|---|---|---|---|
| 4,229,671 A | * | 10/1980 | Lesokhin et al. ............ 310/198 |
| 4,386,288 A | * | 5/1983 | Laurie ....................... 310/49 R |
| 5,194,775 A | * | 3/1993 | Cooper ....................... 310/260 |
| 2004/0000830 A1 | * | 1/2004 | Gomyo et al. ............... 310/179 |

FOREIGN PATENT DOCUMENTS

| | | | | |
|---|---|---|---|---|
| JP | 08-223843 | * | 8/1996 | ............ H02K 3/52 |
| JP | 2000-032743 | * | 11/2000 | ............ H02K 3/52 |
| JP | 2003-324886 | * | 11/2003 | ............ H02K 3/52 |

* cited by examiner

Primary Examiner—Karl Tamai
(74) Attorney, Agent, or Firm—Hogan & Hartson, LLP

(57) ABSTRACT

A motor includes a core having a common connection section formed in a ring shape, a plurality of salient pole sections that protrude and extend radially from the common connection section, each of the salient pole sections defining a common connection section side adjacent to the common connection section and a tip side opposite the common connection section side, and a coil winding wound on each of the salient pole sections. The coil winding is wound on each of the salient pole sections in a plurality of layers, and each of the salient pole sections includes a retaining section adjacent to the tip side thereof, which hooks and supports a lead wire that extends from a winding end part of the coil winding. The coil winding in a top most layer among the plurality of layers is wound from the common connection section side towards the tip side of the corresponding salient pole section, and the lead wire extending from the winding end part of the coil winding in the top most layer is hooked and turned back at the retaining section on the corresponding salient pole section, and held generally straight towards the common connection section side.

20 Claims, 11 Drawing Sheets

CORE FOR MOTOR, MOTOR FURNISHED TO THE CORE AND METHOD FOR MANUFACTURING THE MOTOR

BACKGROUND OF THE INVENTION

1. Field of the Invention

The present invention relates to motors and methods for manufacturing motors in which a coil winding is wound on each salient pole in a plurality of layers.

2. Related Background Art

Motors in recent years are often structured to make them thinner and smaller. For example, an inner rotor-type thin motor used in a magnetic disk device or a hard disk drive (HDD) shown in FIG. 10 is generally made up of a stator section 10 and a rotor section 20. The stator section 10 is provided with a stator core 13 and coil windings 12 wound on the stator core 13, which are provided on an outer circumference upright wall section of a generally flat pan-shaped frame 11, as well as a pair of ball bearings 14 attached on an inner circumference surface side of an inner circumference upright wall section (i.e., a bearing holder) of the frame 11. A rotary shaft 21 of the rotor section 20 is supported in a freely rotatable manner via the pair of ball bearings 14. A generally cup-shaped rotating hub 22 is provided on the rotary shaft 21 in a unitary fashion. A magnetic disk 23 mounted on the outer circumference section of the rotating hub 22 is held immovably by the pressing force of a damper 24 screwed and fixed to the rotating hub 22.

The stator core 13 is made up of a plurality of stacked layers of magnetic plates 13a, which are shaped as shown in FIG. 11, for example, and forms a core body structured as shown in FIG. 12. By mounting a plurality of resin outer circumference guide members 13b, such as shown in FIGS. 13 and 14, on such a staked layered core body, a structure as indicated in FIGS. 15 and 16 is obtained. A common connection section 13A extends in a ring shape on the outer circumference side of the stator core 13, and a plurality of salient pole sections 13B radially protrude from the common connection section 13A, as shown in FIGS. 17 and 18. Each coil winding 12 is wound around a rib section 13B1 that makes up each of the salient pole sections 13B.

Each of the coil windings 12 has a winding section 12a that is wound in a regular winding, for example, along the rib section 13B1 of the corresponding salient pole section 13B. Each of the winding sections 12a is formed by a regular winding that begins at the common connection section 13A side of the stator core 13, turns back just before a magnetic converging teeth section 13B2 provided at the tip side of the corresponding salient pole section 13, and to the common connection section 13A side. By having a set of such regular back and forth winding repeated at least once, each of the coil windings 12 is structured to overlap in a plurality of layers.

A lead wire 12b that extends from a winding end part of each winding section 12a, which is wound in a plurality of layers, is guided and placed along the corresponding guide section 13b, which is mounted on the common connection section 13A, to be led from one salient polo section 13B to another salient pole section 13B. For example, in a three-phase motor with phases U, V and W, one of the winding sections 12a is wound continuously via the corresponding lead wire 12b from the winding beginning (U1, V1 or W1) to the winding termination (U3, V3 or W3), as shown in FIG. 19.

In the wire section 12a of each coil windings 12 in such a conventional motor, winding begins at the common connection section 13A side of the stator core 13 and returns to the common connection section 13A side to form two layers in one back and forth winding, which comprises one unit. This results in a limitation in that the winding sections 12a of the coil windings 12 can be wound only in even number of layers. As a result, even if space in the height direction of winding (i.e., in the motor's axial direction) provides for "three layers" of winding, in reality only "two layers" can be wound, for example. This causes the torque constant Kt to fall or the drive current to increase, which leads to increased power consumption.

In such a situation, the torque constant Kt can be increased by using a smaller coil diameter to increase the number of layers. However, since this would lead to higher winding resistance, the power consumption would increase significantly. In other words, in forming a winding section, a coil winding with appropriately large diameter in relation to a certain amount of winding space must be wound in as many layers as possible.

There is a conventional technique to achieve three layers (i.e., an odd number of layers) of coil winding by utilizing a core side surface. However, the conventional technique proves to be difficult to implement in reality. According to the technique, for example, a coil like a crossover line placed along the core side surface must be fixed to the core side surface before winding a winding section. This would be an extremely difficult work to implement in reality. Furthermore, even if it were possible to fix the coil like a crossover line before winding, the winding work would have to take place over the coil like a crossover line. This, therefore, would entail a problem of not being able to achieve favorable regularity, particularly in regular windings.

SUMMARY OF THE INVENTION

In view of the above, the present invention relates to a motor and a method for manufacturing a motor in which a coil winding can be wound in as many layers as possible in relation to a certain amount of given space in the height direction of winding (i.e., in the motor's axial direction).

In accordance with an embodiment of the present invention, a motor includes a core having a common connection section formed in a ring shape, a plurality of salient pole sections that protrude and extend radially from the common connection section, and a coil winding wound on each of the salient pole sections. The coil winding may be wound on each of the salient pole sections in a plurality of layers. Each of the salient pole sections defines a common connection section side adjacent to the common connection section and a tip side opposite the common connection section side, and includes a retaining section adjacent to the tip side, which hooks and supports a lead wire that extends from a winding end part of the coil winding.

The coil winding in the top most layer may be wound from the common connection section side towards the tip side of the corresponding salient pole section, and the lead wire extending from the winding end part of the coil winding in the top most layer is hooked and turned back at the retaining section, and hold generally straight along the corresponding salient pole section towards the common connection section side, and more preferably held taut like a crossover line along the corresponding salient pole section towards the common connection section side.

According to the motor having such a structure, the top most layer of the winding section of each coil winding can be a layer that is wound from the common connection section side towards the tip side of each salient pole section, and the lead wire of each coil winding led from the top most layer can be returned back to the common connection section via the retaining section. In other words, the top most layer of the winding section of the coil winding can be an odd-numbered layer. As a result, the number of layers is not limited to an even number of layers as in the past, and a certain amount of given winding space in the height direction of the winding (i.e., the motor's axial direction) can be used efficiently without waste.

In one aspect, the lead wire of each of the coil windings that is held taut like a crossover line extends along an outer part of a side section of the winding section of the corresponding coil winding, and within a region defined by a winding height range of the winding section of the coil winding in the motor's axial direction. Consequently, the lead wire of each coil winding held taut like a crossover line is securely prevented from occupying any extra winding space.

In another aspect, the common connection section may be provided with a plurality of guide sections that each guide the lead wire of each of the coil windings that is held taut like a crossover line from one of the salient pole sections to another of the salient pole sections. As a result, the lead wire of each of the coil windings that is held taut like a crossover line is processed easily and securely.

In another aspect, the number of layers of the coil winding wound from the common connection section side towards the tip side of each salient pole section is one layer more than the number of layers wound back from the tip of the salient pole section to the common connection section side. In other words, the number of layers of the coil winding is in an odd number. Consequently, when it is appropriate to have an odd number of layers in the winding section of the coil winding in relation to a certain amount of given winding space, the winding space in the height direction of winding (i.e., the motor's axial direction) can be used efficiently without waste.

Each of the salient pole sections may include a winding rib section and a magnetic converging teeth section adjacent to the winding rib section, wherein the retaining section may be formed from a groove section formed in a tip part of the magnetic converging teeth section of each of the salient pole sections. Each groove section holds the lead wire of the corresponding coil winding that is to be extended taut like a crossover line.

Furthermore, the retaining section may be formed from a flange upright wall section formed in the magnetic converging teeth section provided in a tip part of the winding rib section of each salient pole section, and the lead wire of the coil winding may be hooked on the flange upright wall section.

Moreover, the retaining section may be formed from a columnar protruding section formed upright in the magnetic converging teeth section provided in a tip part of the winding rib section of each salient pole section, and the lead wire of the coil winding may be hooked on the columnar protruding section. By appropriately selecting and employing one of these structures as necessary, effects described above can be obtained.

In accordance with another embodiment of the present invention, a method for manufacturing a motor including a core having a common connection section formed in a ring shape, a plurality of salient pole sections that protrude and extends radially from the common connection section, and a coil winding wound on each of the salient pole sections, wherein the coil winding is wound on each of the salient pole sections in a plurality of layers, and each of the salient pole sections defines a common connection section side adjacent to the common connection section and a tip side opposite the common connection section side. In one aspect, the method includes the step of providing each of the salient pole sections with a retaining section adjacent to the tip side, which hooks and supports a lead wire that extends from a winding end part of the coil winding; winding each of the coil windings in the top most layer from the common connection section side towards the tip side of the corresponding salient pole section, hooking and turning back the lead wire extending from the winding end part of the coil winding in the top most layer at the retain section, and holding the lead wire taut like a crossover line towards the common connection section side.

According to the method for manufacturing a motor described above, the top most layer of the winding section of each coil winding can be a layer that is wound from the common connection section side towards the tip side of each salient pole section, and the lead wire of each coil winding led from the top most layer can be returned back to the common connection section via the retaining section. In other words, the top most layer of the winding section of the coil winding can be an odd-numbered layer. As a result, the layer of the coil winding are not limited to an even number of layers as in the past, and a certain amount of given winding space in the height direction of the winding (i.e., the motor's axial direction) can be used efficiently without waste.

In the method for manufacturing a motor described above, the winding section of each coil winding may have at least one set of regular back and forth winding that begins from the common connection section side, turns back to the opposite direction at the tip side of the corresponding salient pole section, and returns back to the common connection section side; then, the winding section of each coil winding is provided with a regular winding in the top most layer that starts from the common connection section side to the tip side of the corresponding salient pole section and completes the winding. As a result, the winding section of the coil winding has all odd number of layers. Consequently, when it is appropriate to have an odd number of layers in the winding section of the coil winding, a certain amount of given winding space in the height direction of the winding (i.e., the motor's axial direction) can be used efficiently without waste.

Furthermore, in accordance with another aspect of the method for manufacturing a motor, the lead wire of each coil winding is held taut like a crossover line along an outer part on a side section of the winding section of the corresponding coil winding, and within a region defined by the height range of the winding of the winding section in the motor's axial direction. As a consequence, the lead wire of each coil winding held taut like a crossover line is securely prevented from occupying any extra winding space.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 10:
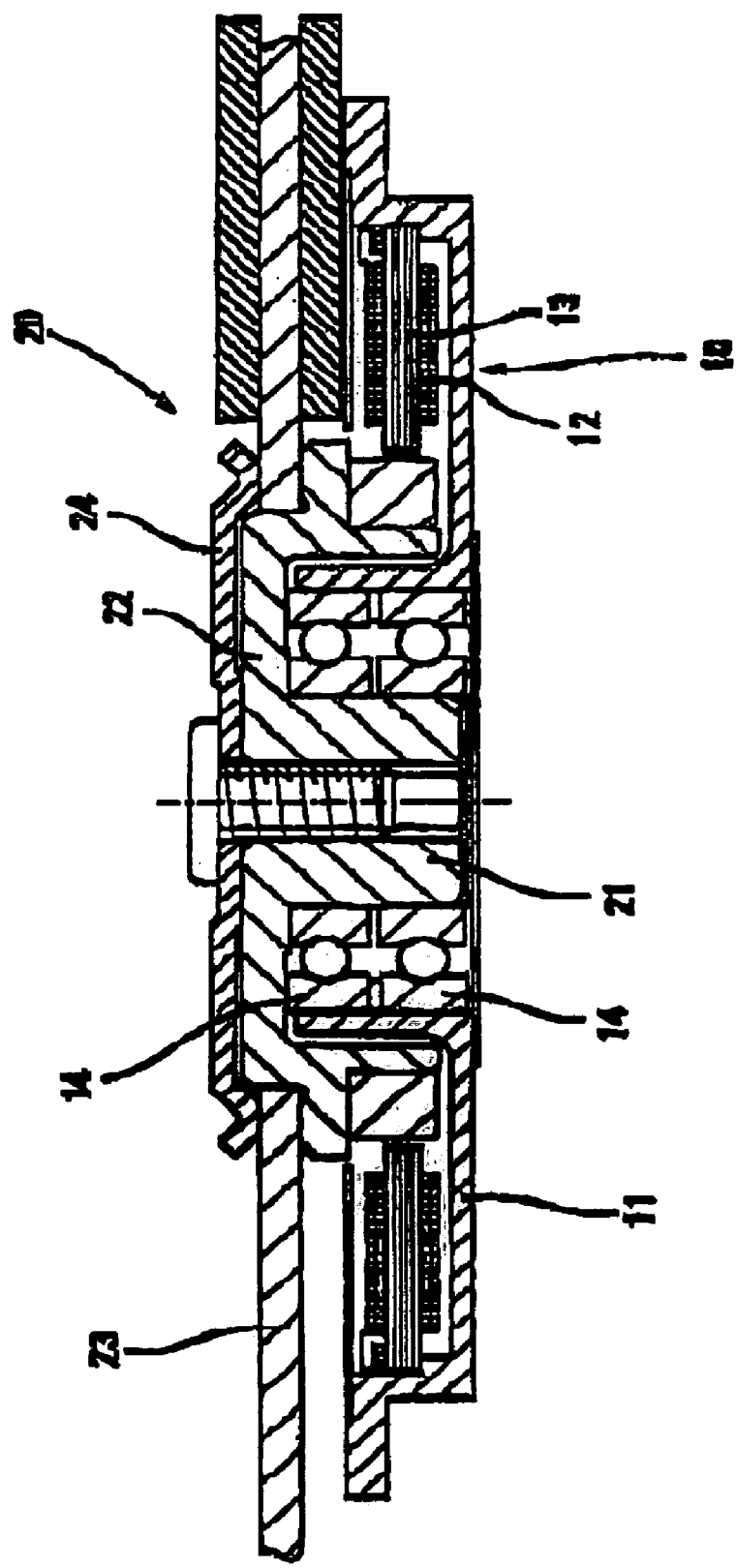
FIG. 10 is a longitudinal cross-sectional view of a general structure of a hard disk drive (HDD) commonly used.
Figure 11:
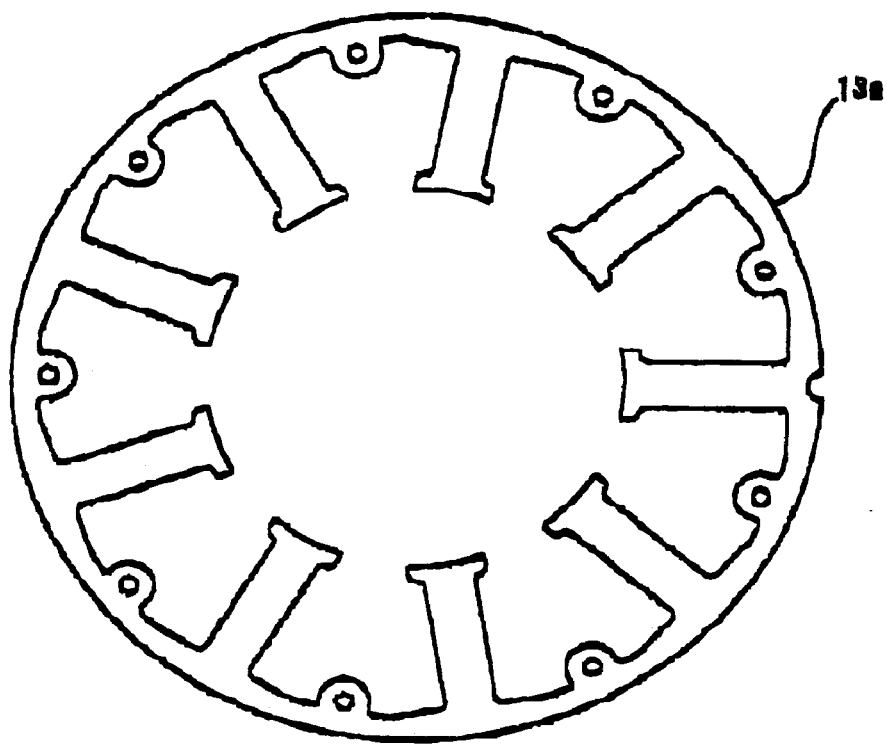
FIG. 11 is a plan view of a structure of a stacked layered body of a stator core used in the motor in FIG. 10.
Figure 12:
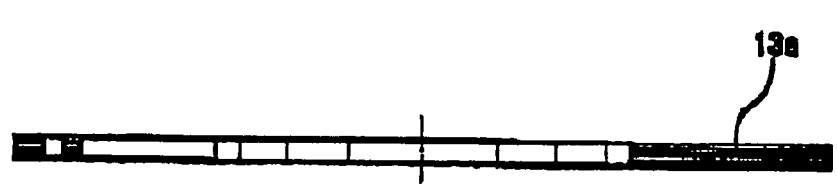
FIG. 12 is a longitudinal cross-sectional view of the stacked layered body of the stator core in FIG. 11.

Next, embodiments in which the present invention is applied to a inner rotor-type thin motor shown in FIG. 10, which may be used in magnetic disk devices or hard disk drives (HDDs), will be described below with reference to the accompanying drawings. The description of the structure of the motor as a whole is omitted since it is essentially the same as the description given earlier, and the embodiments will be described in detail in relation to some aspects of the present invention.

Figure 1:
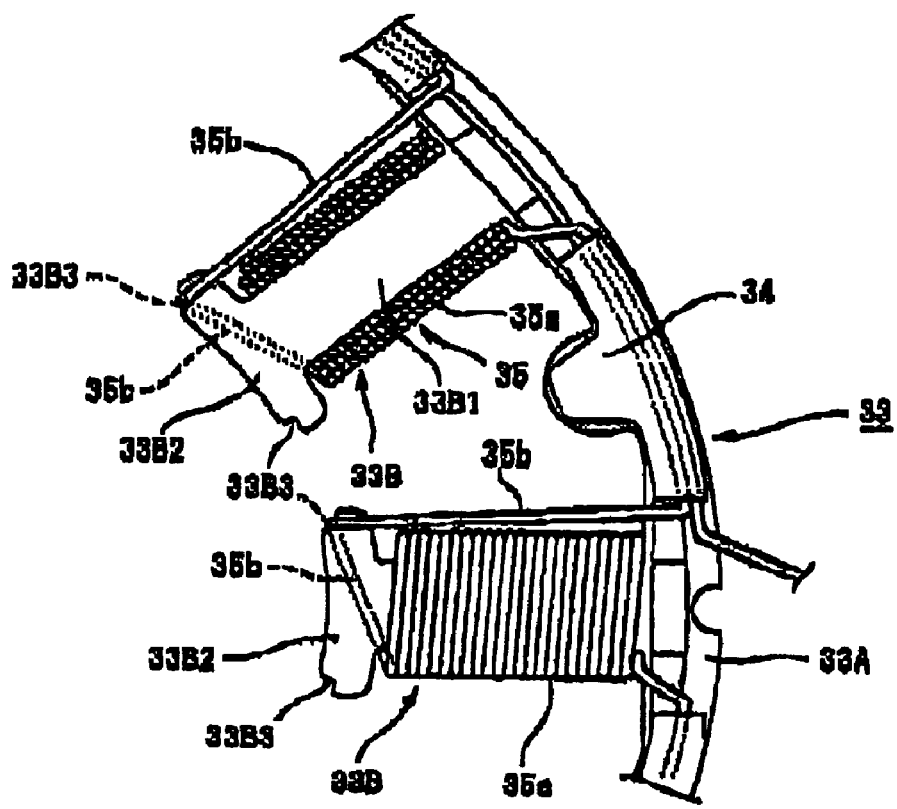
FIG. 1 is an enlarged plan view in part of a core for motor in accordance with one embodiment of the present invention.
Figure 2:
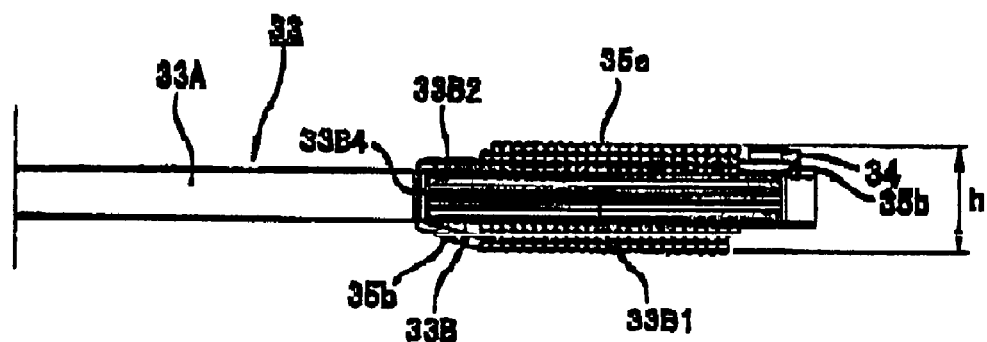
FIG. 2 is a side view in part of the core for motor shown in FIG. 1.
Figure 13:
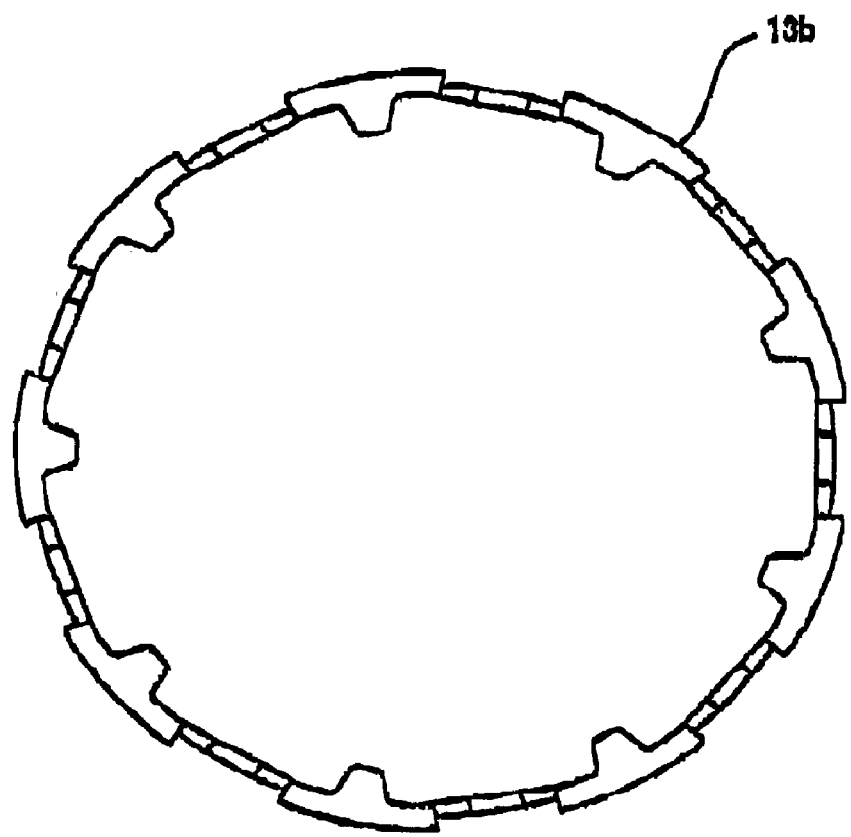
FIG. 13 is a plan view of a structure of guide sections of the stator core used in the motor in FIG. 10.
Figure 14:
FIG. 14 is a side view illustrating the guide sections in FIG. 13.
Figure 15:
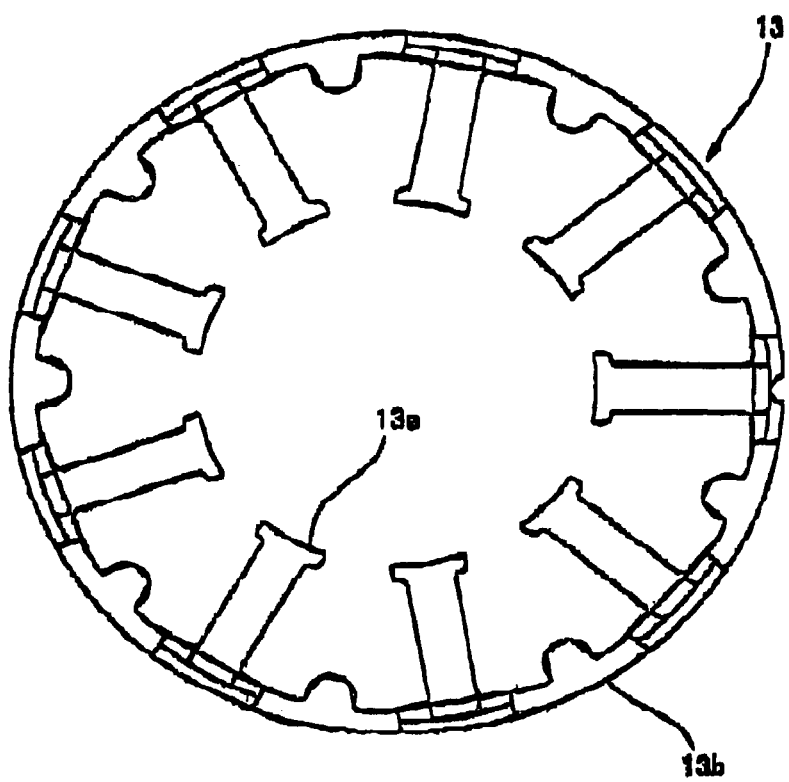
FIG. 15 is a plan view of a structure of a stator core used in the motor in FIG. 10.
Figure 16:
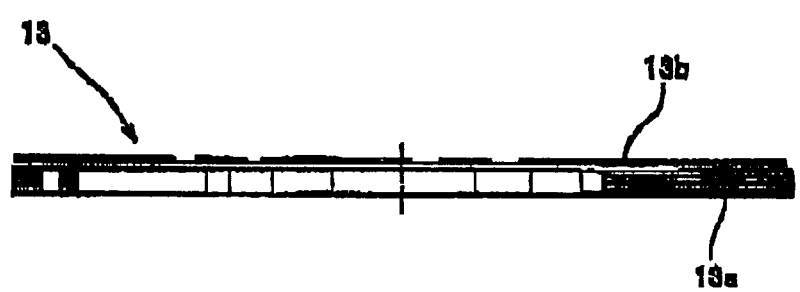
FIG. 16 is a longitudinal cross-sectional view illustrating the stator core in FIG. 15.
Figure 17:
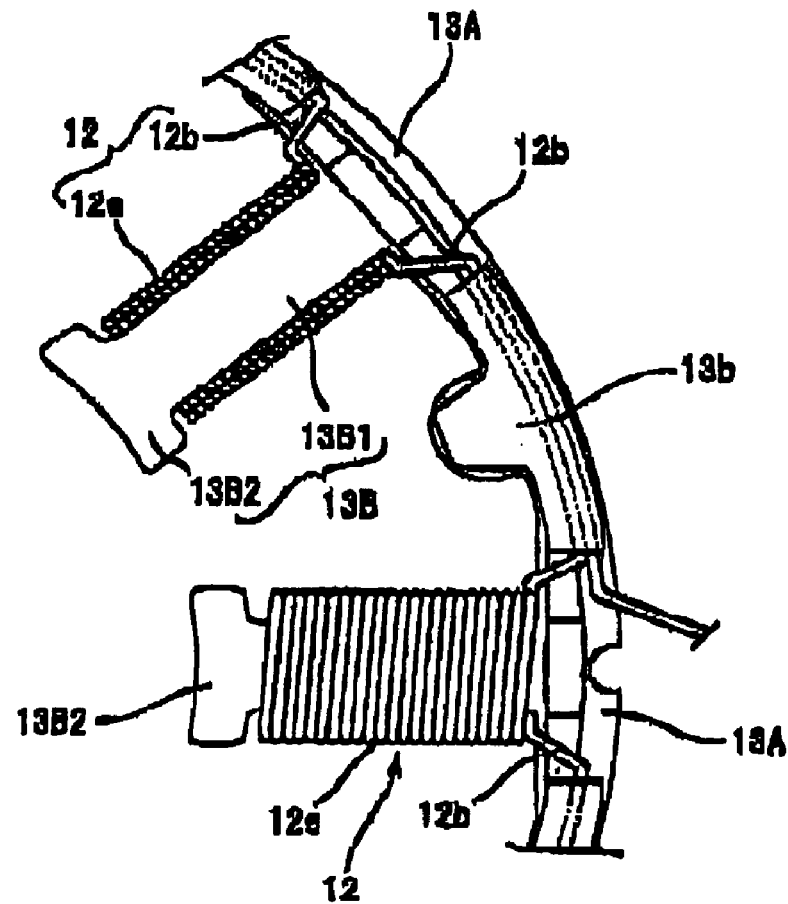
FIG. 17 is an enlarged plan view in part of an ordinary core used in a commonly used motor.
Figure 18:
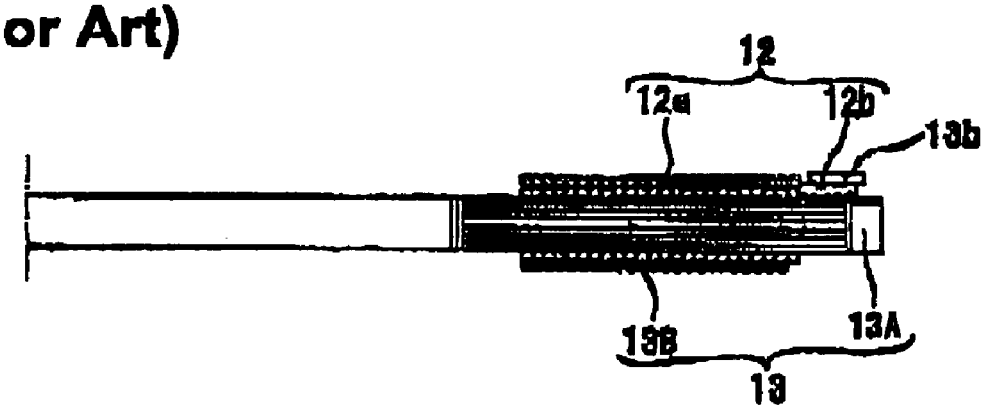
FIG. 18 is a side view in part of the core for motor shown in FIG. 17.
Figure 19:
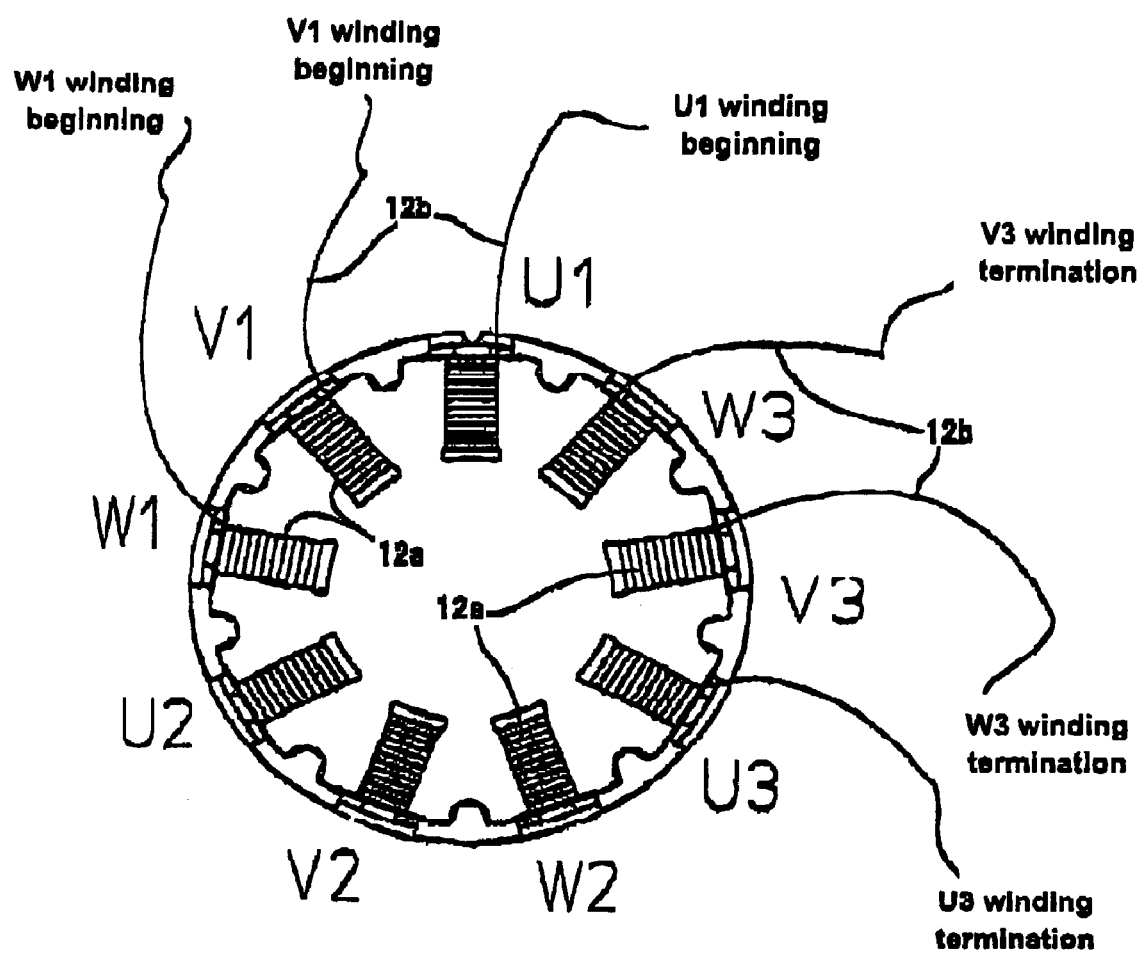
FIG. 19 is a plan view indicating the winding procedure in a three-phase motor.

FIGS. 1 and 2 show a stator core 33 for motor according to the present embodiment. The stator core 33 includes a common connection section 33A formed in a ring shape positioned on its outermost circumference section. A plurality of salient poles 33B radially protrude from the inner circumference wall surface of the common connection section 33A. On the common connection section 33A is mounted a plurality of guide sections 34, which may be made of resin for guiding coils, similar to conventional guide sections (see FIGS. 13 and 14).

Each of the salient pole sections 33B is provided with a rib section 33B1 that extends radially. At the tip of the extension of each rib section 33B1 is provided a magnetic converging teeth section 33B2 formed in an umbrella shape.

A winding section 35a of a corresponding coil winding 35 is wound on each of the rib sections 33B1 along the extension direction of the rib section 33B1, in such a way that the winding section 35a is wound overlapping in an odd number of layers, as described later. Each winding section 35a according to the present embodiment is formed by a regular winding comprising "three layers."

A structure of the regular winding of the winding section 35a of each coil winding will be described. The winding section 35a of each coil winding 35 begins its winding of the first layer on the corresponding rib section 33B1 from a part close to the base of the common connection section 33A side, winds towards the magnetic converging teeth section 33B2 at the tip side, turns back at a position close to the magnetic converging teeth section 33B2, and begins the second layer. In the second layer, the winding continues until it has returned back to the common connection section 33A side, which completes one set of back and forth winding. Next, the winding begins atop the second layer from the common connection section 33A side and proceeds towards the magnetic converging teeth section 33B2 at the tip side to form the third layer, which is the top most layer, and the winding ends at a position close to the magnetic converging teeth section 33B2.

In this way, the winding section 35a of each coil winding 35 according to the present embodiment has an odd number of layers (three layers), which comprises a total number of layers of winding from the common connection section 33A side towards the tip side of the corresponding salient pole section 33B (two layers) that is one layer more than the total number of layers (one layer) of winding back from the tip side of the salient pole section 33B towards the common connection section 33A side. In other words, according to the present embodiment, the total number of layers of winding from the common connection section 33A side towards the tip side of each salient pole section 33B is two layers, which is one layer more than a total of one layer of winding back from the tip side of the salient pole section 33B towards the common connection section 33A; this results in each winding section 35a's having an odd number of layers, namely a total of three layers.

A lead wire 35b is led from a winding termination end section of the top most layer of each winding section 35a. Each lead wire 35b extends at a slant to the radial direction and towards the inner circumference surface (tip surface) of the corresponding magnetic converging teeth section 33B2, which is placed at the tip side of the corresponding salient pole section 33B. The lead wire 35b is then hooked on and around the magnetic converging teeth section 33B2.

In other words, at either end section in the circumferential direction of a magnetic converging surface formed on the inner circumference surface (tip surface) of each of the magnetic converging teeth sections 33B2 is provided a retaining section 33B3, which comprises a concave groove section and extends along the thickness direction of the core (i.e., the motor's axial direction). By having some point along the load wire 35b held in the concave groove section of the corresponding retaining section 33B3, the lead wire 35b is supported. After passing through the retaining section 33B3, the lead wire 35b is turned back outward in the radial direction toward the common connection section 33A side without being wound. In other words, the lead wire 35b is turned back at the retaining section 33B3 to extend outward in the radial direction and held generally straight, preferably taut like a crossover line as it is returned to the common connection section 33A side.

The lead wire 35b of each coil winding 35 thus held taut like a crossover line is positioned along the outer part on a side section of the corresponding winding section 35a. According particularly to the present embodiment, each lead wire 35b extends to pass through a region defined by the range of winding height (see "h" in FIG. 2) in the motor's axial direction of the corresponding winding section 35a. The lead wire 35b that has been returned to the common connection section 33A side like a crossover line is wound from the outer side around the outer circumference side of the corresponding guide section 34, which is mounted on the common connection section 33A, to be engaged to the guide section 34; this causes the lead wire 35b to be guided to extend from one salient pole section 33B to another salient pole section 33B in the same phase.

According to the motor in the present embodiment having a structure as described, the top most layer of the winding section 35a of each coil winding 35 can be a layer of winding from the common connection section 33A side towards the tip side of the corresponding salient pole section 33B, and the lead wire 35b of the coil winding 35 led from the top most layer can be returned back to the common connection section 33A side via the corresponding retaining section 33B3, preferably without being wound on the corresponding salient pole section 33B. In other words, the number of layers is not limited to an even number of layers as in the past since the top most layer of the winding section 35a of each coil winding 35 can be an odd-numbered layer (i.e. the third layer). Consequently, a certain amount of given winding space in the height direction of the winding (i.e., the motor's axial direction) can be used efficiently without waste.

Furthermore, according to the present embodiment, the lead wire 35b of each coil winding 35 that is led from the winding termination end part of the corresponding winding section 35a and held preferably taut like a crossover line is an outer section of the winding section 35a, and the lead wire 35b extends along and within a region defined by the height range of the corresponding winding section 35a. Consequently, the load wire 35b of each coil winding 35 held taut like a crossover line is securely prevented from occupying any extra winding space.

Also according to the present embodiment, each of the guide sections 34 mounted on the common connection section 33A of the core for motor favorably guides the lead wire 35b of each coil winding 35 like a crossover line from one salient pole section 33B to another salient pole section 33B. As a result, the lead wire 35b of each coil winding 35 that is held taut like a crossover line is processed easily and securely.

According to the present embodiment, there is an odd number of layers (three layers, for example) of each coil winding 35, in which the number of layers of winding from the common connection section 33A side towards the tip side of the corresponding salient pole section 33B is one layer more than the number of layers of winding back from the tip side of the salient pole section 33B towards the common connection section 33A side. Consequently, when it is appropriate to have an odd number of layers in the winding section 35a in relation to a certain amount of given winding space, the winding space in the height direction of the winding (i.e., the motor's axial direction) can be used efficiently without waste.

Figure 3:
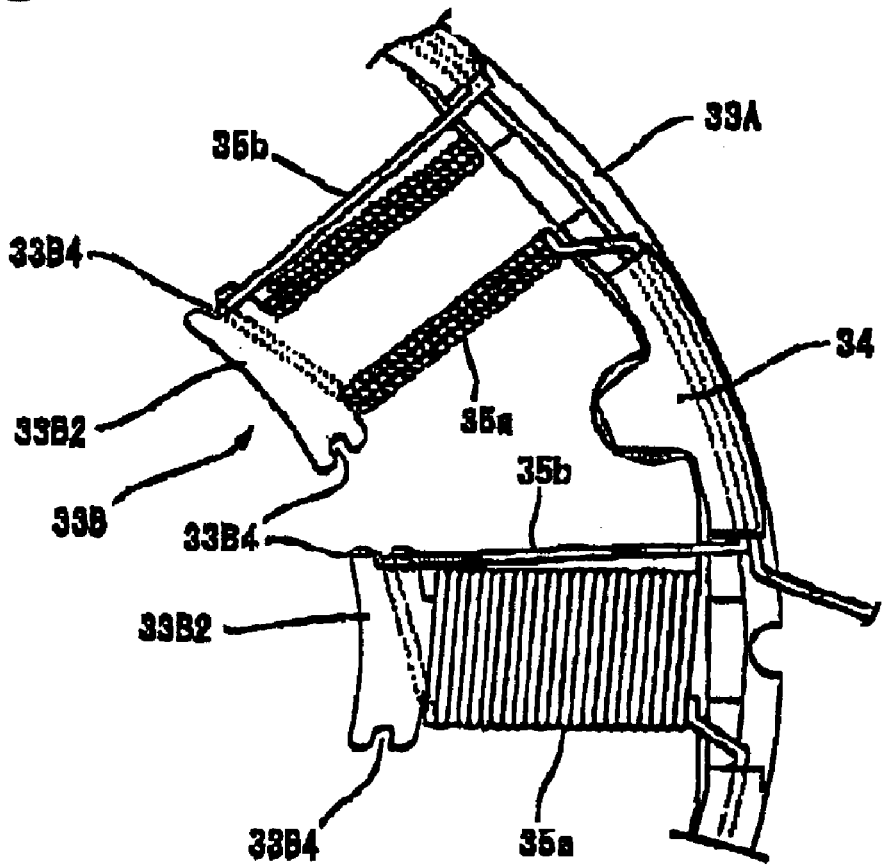
FIG. 3 is an enlarged plan view in part of a core for motor in accordance with another embodiment of the present invention.
Figure 4:
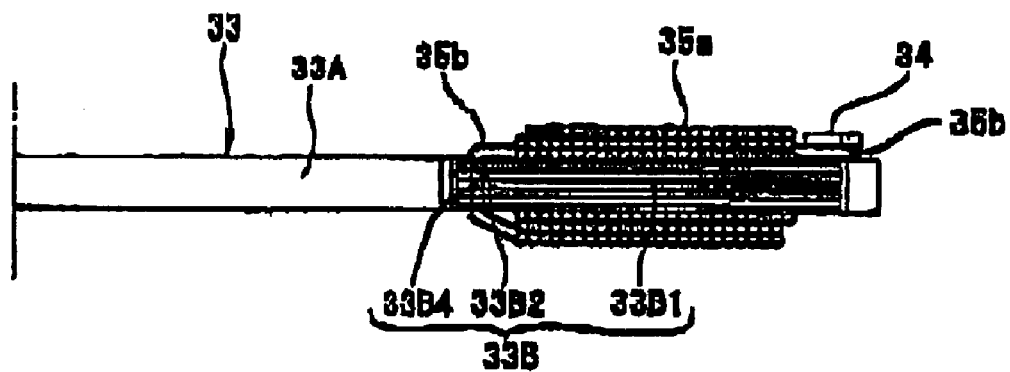
FIG. 4 is a side view in part of the core for motor shown in FIG. 3.

In the meantime, in an embodiment shown in FIGS. 3 and 4, a retaining section 33B4 is formed as at least one concave groove on the side surface on either end side in the circumferential direction of a magnetic converging teeth section 33B2 provided at a tip part of each salient pole section 33B.

Figure 5:
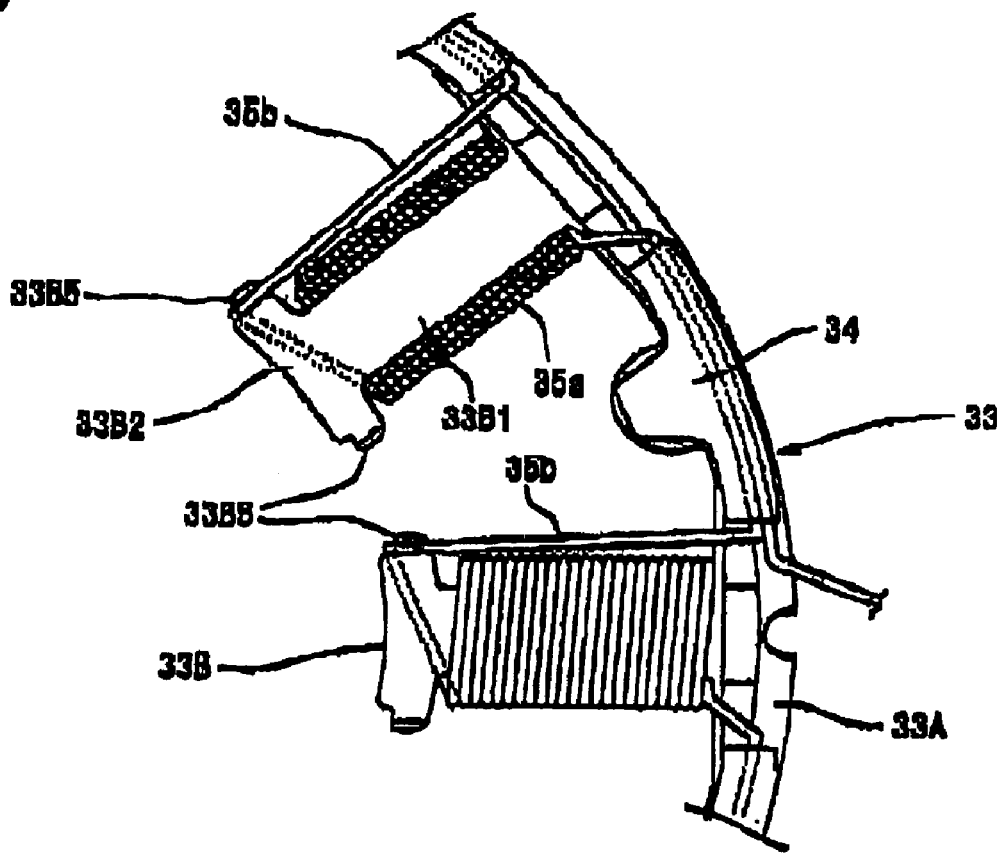
FIG. 5 is an enlarged plan view in part of a core for motor in accordance with another embodiment of the present invention.
Figure 6:
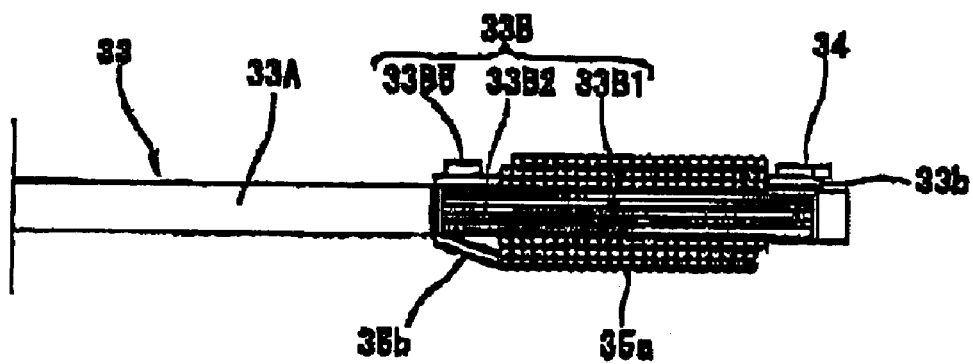
FIG. 6 is a side view in part of the core for motor shown in FIG. 5.
Figure 7:
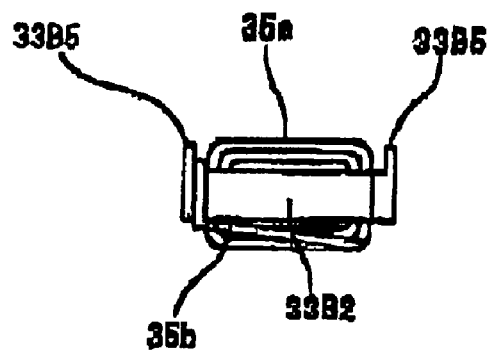
FIG. 7 is a front view of one salient pole section of the core for motor shown in FIG. 5.

Furthermore, a retaining section 33B5 according to an embodiment shown in FIGS. 5, 6 and 7 comprises at least one flange wall section formed in each magnetic converging teeth section 33B2. A lead wire 35b of each coil winding 35 is hooked like a crossover line on the corresponding retaining section 33B5 comprising the flange wall section.

Figure 8:
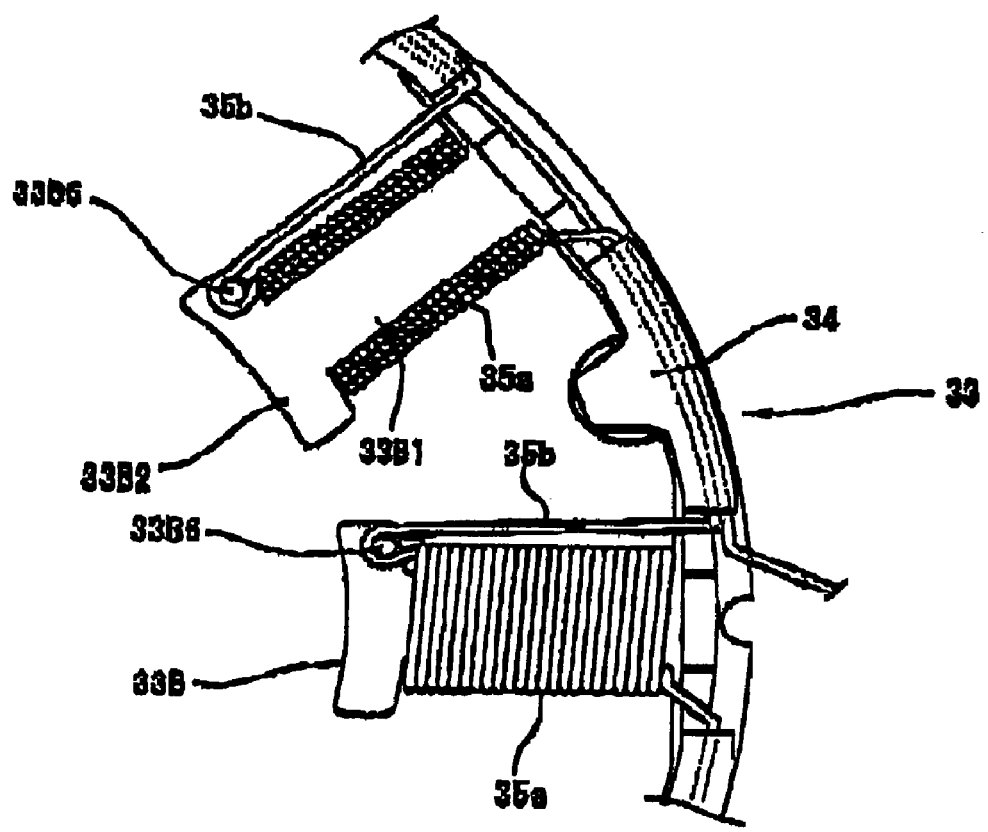
FIG. 8 is an enlarged plan view in part of a core for motor in accordance with another embodiment of the present invention.
Figure 9:
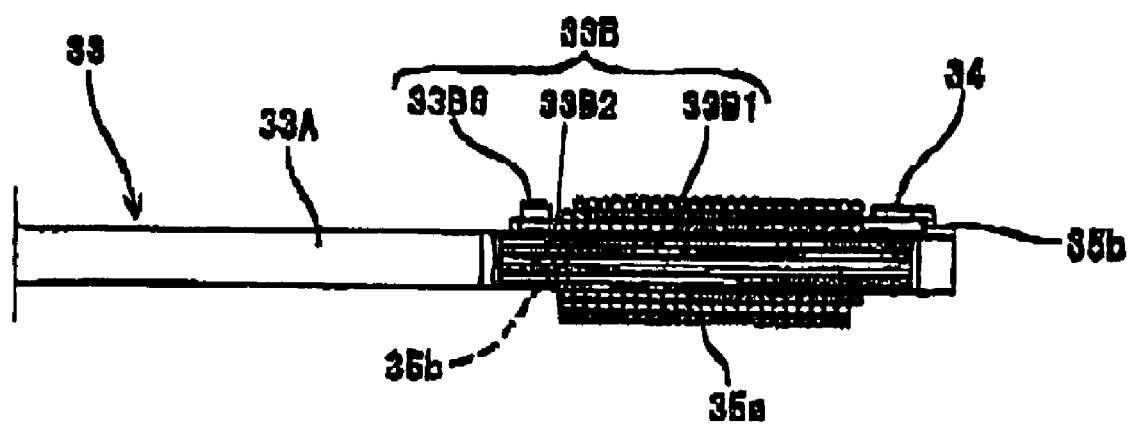
FIG. 9 is a side view in part of the core for motor shown in FIG. 8.

Moreover, a retaining section 33B6 according to an embodiment shown in FIGS. 8 and 9 comprises a columnar protruding section formed upright in each magnetic converging teeth section 33B2. A lead wire 35b of each coil winding 35 is hooked like a crossover line on the corresponding retaining section 33B6 comprising the columnar protruding section. Workings and effects similar to those in the embodiment described earlier can be obtained by using any of the retaining sections 33B3, 33B5 and 33B6 in the respective embodiments. Consequently, the various retaining sections can be appropriately selected and employed as necessary.

This concludes the detailed descriptions of the invention based on the embodiments, but the present invention is not limited to the embodiments and many modifications can be made without departing from the present invention.

For example, in each of the embodiments described, a retaining section is provided on a magnetic converging teeth section of each salient pole section, but the retaining section can be similarly formed on any other parts of the salient pole sections.

Furthermore, each of the embodiments described entails the application of the present invention to an inner rotor-type hard disk drive device, but the present invention is not limited to such an application and may be similarly applied to outer rotor-type hard disk drive devices, disk devices for various other apparatuses, and to various motors used on other apparatuses.

Moreover, although each of the embodiments is described in reference to a shaft rotation-type motor, the present invention can also be applied to fixed shaft-type motors. In this case, the fixed shaft-type motor may be fixed at both ends or only at one end.

As described above, a retaining section that hooks and supports some point along a lead wire, which extends from a winding end part of a winding section of each coil winding, is provided at a tip part on a protruding side of each salient pole section that protrudes from a common connection section, and the top most layer of the winding section of each coil winding can be a layer that is wound from the common connection section side towards the tip side of each salient pole section, such that the top most layer of the winding section of each coil winding can be an odd-numbered layer. As a result, the number of layers is not limited to an even number of layers as in the past, and a certain amount of given winding space in the height direction of the winding can be used efficiently without waste. This makes it possible to wind the coil winding in as many layers as possible in relation to the winding space inside the motor, thereby making a thin and high-performance motor easy to obtain.

Since the lead wire of each coil winding that is held preferably taut like a crossover line is an outer part on a side section of the winding section of the corresponding coil winding, and the lead wire extends along and within a region defined by the height range of the winding of the winding section in the motors axial direction, such that the lead wire of each coil winding held taut like a crossover line is securely prevented from occupying any extra winding space.

As a result, the effects described can be further enhanced.

Furthermore, a plurality of guide sections that each guides a lead wire section of each coil winding, which is led like a crossover line, from one salient pole section to another salient pole section is provided in the common connection section, such that the lead wire of each coil winding that is held taut like a crossover line can be processed easily and securely. As a result, in addition to the effects described, the reliability and productivity of the motor can be improved.

Furthermore, the number of layers of the coil winding wound from the common connection section side towards the tip side of each salient pole section is one layer more than the number of layers wound back from the tip of the salient pole section to the common connection section side, in other words, the number of layers of the coil winding is in an odd number, such that the winding space in the height direction of winding can be used efficiently and without waste. Consequently, when it is appropriate to have an odd number of layers in the winding section of the coil winding in relation to a certain amount of given winding space, the effects described above can be ensured.

Moreover, the retaining section comprises a groove section formed in a magnetic converging teeth section provided in a tip part of a winding rib section of each salient pole section, and the groove section is structured to hold the lead wire of the corresponding coil winding like a crossover line.

Furthermore, the retaining section may be formed from a flange wall section formed in a magnetic converging teeth section provided in a tip part of a winding rib section of each salient pole section, and the lead wire of the corresponding coil winding is hooked on the flange wall section and held taut like a crossover line along each salient pole section. Moreover, the retaining section may be formed from a columnar protruding section formed upright in a magnetic converging teeth section provided in a tip part of a winding rib section of each salient pole section, and the lead wire of the corresponding coil winding is hooked like a crossover line on the columnar protruding section. By appropriately selecting and employing one of these structures as necessary, freedom in designing can be expanded and productivity can be improved, in addition to obtaining the effects described.

In the meantime, according to a method for manufacturing a motor in accordance with the present invention, a retaining section that hooks and supports some point along a lead wire, which extends from a winding end part of a winding section of each coil winding, is provided at a tip part on a protruding side of each salient pole section that protrudes from a common connection section, and the top most layer of the winding section of each coil winding can be a layer that is wound from the common connection section side towards the tip side of each salient pole section, such that the top most layer of the winding section of each coil winding can be an odd-numbered layer. As a result, the number of layers is not limited to an even number of layers as in the past, and a certain amount of given winding space in the height direction of the winding can be used efficiently without waste. This makes it possible to wind the coil winding in as many layers as possible in relation to the winding space inside the motor, thereby making a thin and high-performance motor easy to obtain.

In the method for manufacturing a motor, the winding section of each coil winding may include at least one set of regular back and forth windings that begins from the common connection section side, turns back to the opposite direction at the tip side of the corresponding salient pole section, and returns back to the common connection section side; after this, the winding section of each coil winding may include a regular winding in the top most layer starting from the common connection section side and ending in the tip side of the corresponding salient pole section, thereby forming a winding section comprising an odd number of layers. As a result, a given winding space in the height direction of the winding (i.e. the motor's axial direction) can be used efficiently without waste. Consequently, especially when it is appropriate to have an odd number of layers in the winding section of each coil winding, the effects described above can be ensured.

Furthermore, the lead wire of each coil winding that is held preferably taut like a crossover line may be an outer part on a side section of the winding section of the corresponding coil winding, and the lead wire may extend along and within a region defined by the height range of the winding of the winding section in the motor's axial direction, such that the lead wire of each coil winding held taut like a crossover line is securely prevented from occupying any extra winding space. As a result, effects described above can be further enhanced.

While the description above refers to particular embodiments of the present invention, it will be understood that many modifications may be made without departing from the spirit thereof. The accompanying claims are intended to cover such modification as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a core having a common connection section formed in a ring shape, a plurality of salient pole sections that protrude and extend radially from the common connection section, each of the salient pole sections defining a common connection section side adjacent to the common connection section and a tip side opposite the common connection section side, and a coil winding wound on each of the salient pole sections,
   wherein the coil winding is wound on each of the salient pole section in a plurality of layers, and each of the salient pole sections includes a retaining section adjacent to the tip side thereof, which hooks and supports a lead wire that extends from a winding end part of the coil winding,
   wherein each of the salient pole sections includes a winding rib section and a magnetic converging teeth section adjacent to the winding rib section, wherein the retaining section is formed in the magnetic converging teeth section.

2. A motor according to claim 1, wherein the coil winding in a top most layer among the plurality of layers is wound from the common connection section side towards the tip side of the corresponding salient pole section, and the lead wire extending from the winding end part of the coil winding in the top most layer is hooked and turned back at the retaining section on the corresponding salient pole section, and held generally straight towards the common connection section side.

3. A motor according to claim 2, wherein the lead wire of each of the coil windings that is held generally straight defines an outer part of a side section of the winding section of the corresponding coil winding.

4. A motor according to claim 3, wherein the lead wire of each of the coil windings that is held generally straight at the outer part of the side section of the winding section of the corresponding coil winding is within a region defined by a winding height range of the winding section of the coil winding in an axial direction of the motor.

5. A motor according to claim 1, wherein the common connection section includes a plurality of guide sections, wherein each of the guide sections guides the lead wire of each of the coil windings that is held generally straight toward the common connection section from one of the salient pole sections to another of the salient pole sections.

6. A motor according to claim 1, wherein the number of the layers of the coil winding is in an odd number.

7. A motor according to claim 6, wherein the number of the layers of the coil winding wound from the common connection section side towards the tip side of the corresponding salient pole section is one layer more than the number of layers wound back from the tip of the salient pole section to the common connection section side.

8. A motor according to claim 1, wherein the retaining section is at least one groove section formed in the magnetic converging teeth section of each of the salient pole sections.

9. A motor according to claim 1, wherein the retaining section is at least one flange wall section formed in the magnetic converging teeth section of each of the salient pole sections.

10. A motor according to claim 1, wherein the retaining section is a columnar protruding section formed in the magnetic converging teeth section provided in the winding rib section of each of the salient pole sections.

11. A core for a motor, the core comprising:
a common connection section formed in a ring shape;
a plurality of salient pole section that protrude and extend radially from the common connection section, each of the salient pole sections defining a common connection section side adjacent to the common connection section and a tip side opposite the common connection section side; and
a coil winding wound on each of the salient pole sections, wherein the coil winding is wound on each of the salient pole sections in a plurality of layers and each of the salient pole sections includes a retaining section adjacent to the tip side thereof, which hooks and supports a lead wire that extends from a winding end part of the coil winding,
wherein each of the salient pole sections includes a winding rib section and a magnetic converging teeth section adjacent to the winding rib section, wherein the retaining section is formed in the magnetic converging teeth section.

12. A core for a motor according to claim 11, wherein the coil winding in a top most layer among the plurality of layers is wound from the common connection section side towards the tip side of the corresponding salient pole section, and the lead wire extending from the winding end part of the coil winding in the top most layer is hooked and turned back at the retaining section on the corresponding salient pole section, and held generally straight towards the common connection section side.

13. A core for a motor according to claim 12, wherein the lead wire of each of the coil windings that is held generally straight defines an outer part of a side section of the winding section of the corresponding coil winding.

14. A core for a motor according to claim 13, wherein the lead wire of each of the coil windings that is held generally straight at the outer part of the side section of the winding section of the corresponding coil winding is within a region defined by a winding height range of the winding section of the coil winding in an axial direction of the motor.

15. A core for a motor according to claim 11, wherein the common connection section includes a plurality of guide sections, wherein each of the guide sections guides the lead wire of each of the coil windings that is held generally straight toward the common connection section from one of the salient pole sections to another of the salient pole sections.

16. A core for a motor according to claim 11, wherein the number of the layers of the coil winding is in an odd number.

17. A core for a motor according to claim 16, wherein the number of the layers of the coil winding wound from the common connection section side towards the tip side of the corresponding salient pole section is one layer more than the number of layers wound back from the tip of the salient pole section to the common connection section side.

18. A core for a motor according to claim 11, wherein the retaining section is at least one groove section formed in the magnetic converging teeth section of each of the salient pole sections.

19. A core for a motor according to claim 11, wherein the retaining section is at least one flange wall section formed in the magnetic converging teeth section of each of the salient pole sections.

20. A core for a motor according to claim 11, wherein the retaining section is a columnar protruding section formed in the magnetic converging teeth section provided in the winding rib section of each of the salient pole sections.

* * * * *